United States Patent
Kim et al.

(10) Patent No.: US 7,804,771 B2
(45) Date of Patent: *Sep. 28, 2010

(54) METHOD AND APPARATUS FOR PROTECTION SWITCHING IN VIRTUAL PRIVATE NETWORKS

(76) Inventors: Dongsoo S. Kim, 1641 E. Jefferson St., T3, Rockville, MD (US) 20852; Antonio Ruiz, 111 Roosevelt Dr., Poughquaq, NY (US) 12570; Dhadesugoor R. Vaman, 8399 Buckeye Ct., Frederick, MD (US) 21702; Joonbum Byun, 1621 E. Jefferson St., Rockville, MD (US) 20852

( * ) Notice: Subject to any disclaimer, the term of this patent is extended or adjusted under 35 U.S.C. 154(b) by 613 days.

This patent is subject to a terminal disclaimer.

(21) Appl. No.: 11/352,606

(22) Filed: Feb. 13, 2006

(65) Prior Publication Data

US 2006/0203719 A1 Sep. 14, 2006

Related U.S. Application Data

(63) Continuation of application No. 09/777,925, filed on Feb. 6, 2001, now Pat. No. 7,082,101, which is a continuation-in-part of application No. 09/395,831, filed on Sep. 14, 1999, now abandoned.

(51) Int. Cl.
    *H04L 1/00* (2006.01)
(52) U.S. Cl. .................................... 370/225
(58) Field of Classification Search .......... 370/217–228
    See application file for complete search history.

(56) References Cited

U.S. PATENT DOCUMENTS

| | | | |
|---|---|---|---|
| 5,084,867 A * | 1/1992 | Tachibana et al. ........... 370/398 |
| 5,712,847 A | 1/1998 | Hata | |
| 5,715,237 A | 2/1998 | Akiyoshi | |
| 5,793,745 A * | 8/1998 | Manchester ................ 370/224 |
| 5,838,924 A * | 11/1998 | Anderson et al. ........... 709/239 |
| 5,848,055 A | 12/1998 | Fedyk et al. | |
| 5,870,382 A | 2/1999 | Tounai et al. | |
| 5,898,673 A | 4/1999 | Riggan et al. | |
| 5,959,972 A | 9/1999 | Hamami | |
| 6,011,780 A * | 1/2000 | Vaman et al. ............... 370/237 |
| 6,041,037 A | 3/2000 | Nishio et al. | |
| 6,064,653 A | 5/2000 | Farris | |

(Continued)

OTHER PUBLICATIONS

Makam et al, A Path Protection/Restoration Mechanism for MPLS Networks, Internet Draft, pp. 1-24, Nov. 2000.*

(Continued)

*Primary Examiner*—Frank Duong
(74) *Attorney, Agent, or Firm*—Davis Wright Tremaine LLP; Michael J. Donohue

(57) ABSTRACT

Protection switching of a virtual private network is provided whereby working VPN paths and protection VPN paths are defined. The working VPN path is monitored for increased data traffic and failures, and in response, data is switched from the working VPN path to the protection VPN path. The working VPN path is monitored for a return to proper functioning and normal data conditions, and data is then switched back from the protection VPN path to the working VPN path. Additionally, data capacity is managed through virtual bandwidth classes, and different classes of qualities of service are provided.

41 Claims, 4 Drawing Sheets

U.S. PATENT DOCUMENTS

| | | | |
|---|---|---|---|
| 6,145,005 A | 11/2000 | Kirkby | |
| 6,236,640 B1 | 5/2001 | Klink | |
| 6,272,107 B1 * | 8/2001 | Rochberger et al. | 370/216 |
| 6,353,593 B1 * | 3/2002 | Chen et al. | 370/216 |
| 6,359,857 B1 * | 3/2002 | Ahmad et al. | 370/217 |
| 6,426,941 B1 * | 7/2002 | Vaman et al. | 370/228 |
| 6,532,088 B1 | 3/2003 | Dantu et al. | |
| 6,535,481 B1 | 3/2003 | Andersson et al. | |
| 6,580,690 B1 | 6/2003 | Damien | |
| 6,636,516 B1 | 10/2003 | Yamano | |
| 6,654,923 B1 * | 11/2003 | Grenier et al. | 714/752 |
| 6,665,263 B1 * | 12/2003 | Kawabata et al. | 370/219 |
| 6,721,269 B2 | 4/2004 | Cao et al. | |
| 6,760,302 B1 | 7/2004 | Ellinas et al. | |
| 6,775,229 B1 | 8/2004 | Mo et al. | |
| 2003/0063561 A1 | 4/2003 | Klink | |

OTHER PUBLICATIONS

ITU-T, I.630: ATM protection switching, 43 pages, Feb. 1999.*
Yang et al., A Taxonomy for Congestion Control Algorithms in Packet Switching Networks, IEEE Network Magazine, Jul./Aug. 1995, pp. 34-35, vol. 9.
Traffic Management Specification Version 4.0, The ATM Forum Technical Committee, Apr. 1996.
Rosen et al., BGP/MPLS VPNs, RFC 2547, pp. 1-25, 1999.
Casey et al., IP VPN Realization using MPLS Tunnels, Internet Draft, pp. 1-18, 1998.
Makam et al., a Path Protection/Restoration Mechanism for MPLS Networks, Internet Draft, pp. 1-24, Nov. 2000.

* cited by examiner

User data sent on user VPN path

Block Overheads of different user data sent on Management VPN (working as well as protection management channels)

METHOD AND APPARATUS FOR PROTECTION SWITCHING IN VIRTUAL PRIVATE NETWORKS

This is a continuation in part of Ser. No. 09/395,831 filed Sep. 14, 1999.

BACKGROUND OF THE INVENTION

1. Field of the Invention

The invention relates to protection switching for transmission systems, and more particularly to application of protection switching for virtual private networks (VPNs)

2. Art Background

Network congestion control methods address the capacity of a network as a whole to carry the offered traffic. In contrast, flow control methods address the point-to-point communication between a sender and a receiver, by adapting the data rate of the sender to the data rate at which the receiver can process the traffic. Basically, congestion control methods address the ability of a network to handle traffic, while flow control addresses the ability of the receiving devices to follow the speed of the transmitting devices.

The majority of congestion control methods have traditionally been categorized as part of traffic management. Therefore, congestion control methods used in the past have involved methods that rely on modifying or shaping the traffic at the traffic source, or at the network entrance point, in order to prevent or to handle congestion. Typical congestion control techniques include "open loop" and "closed loop" methods. The open loop methods, by definition, involve steps the network takes prior to servicing the traffic. All open loop methods are based on pre-dimensioning the network and do not follow the dynamic changes in the traffic using the network.

Closed loop methods, on the other hand, are based on feedback received from the network. Closed loop techniques monitor the system to detect the time and location of congestion occurrence, convey the congestion notification to the parts of the system that can adjust the system operation, and ultimately, adjust the system operation. Closed loop methods are reactive in the sense that they do not act until congestion is already in place, and therefore service degradations may occur.

For the case of a fault in a transmission channel of the communication system—e.g., a channel failure which results in the loss of all data being transmitted via the channel, it is known to provide a protection channel for rerouting of the data from the channel experiencing the fault. The routing of traffic from a faulty channel onto the protection channel is known as protection switching.

Virtual Private Networks (VPNs) represent a class of transmission services for which congestion control has not been effectively developed. VPNs permit implementation of a private network through utilization of the public network infrastructure. Such networks may be implemented using technologies such as Internet Protocol (IP), Frame Relay, and Asynchronous Transfer Mode (ATM).

Accordingly, the need arises for protection switching of VPNs, so that data can be reliably transmitted from source to destination at all times and especially during network failure. Additionally, the need arises for protection switching of VPNs so that network congestion can effectively be handled.

OBJECTS AND SUMMARY OF THE INVENTION

It is an object of the invention to provide a method and apparatus for protection switching of virtual private networks (VPNs) which allows data to be reliably transmitted across a VPN through the use of working and protection VPN paths and detection and switching of data between those paths.

It is yet another object of the present invention to provide for the detection of increased data traffic and errors on a working VPN path.

It is still another object of the present invention to provide for the switching of data from a working VPN path to a protection VPN path when increased data traffic and errors are detected on the working VPN path.

It is an additional object of the present invention to provide for the detection of a return-to-normal condition of a VPN path.

It is a further object of the present invention to provide for the switching of data from a protection VPN path to a working VPN path when a return-to-normal condition is detected on the working VPN path.

It is another object of the present invention to provide for data capacity management of a VPN path through the use of virtual bandwidth classes.

It is a further object of the present invention to provide for the establishment of different classes of qualities of service (QoS's).

Protection switching of a virtual private network is provided whereby working VPN paths and protection VPN paths are defined. The working VPN path is monitored for traffic congestion and failures, and in response, data is switched from the working VPN path to the protection VPN path. The working VPN path is monitored for a return to proper functioning and normal data conditions, and data is then switched back from the protection VPN path to the working VPN path. Additionally, data capacity is managed through virtual bandwidth classes, and different classes of qualities of service are provided.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

Figure 1:
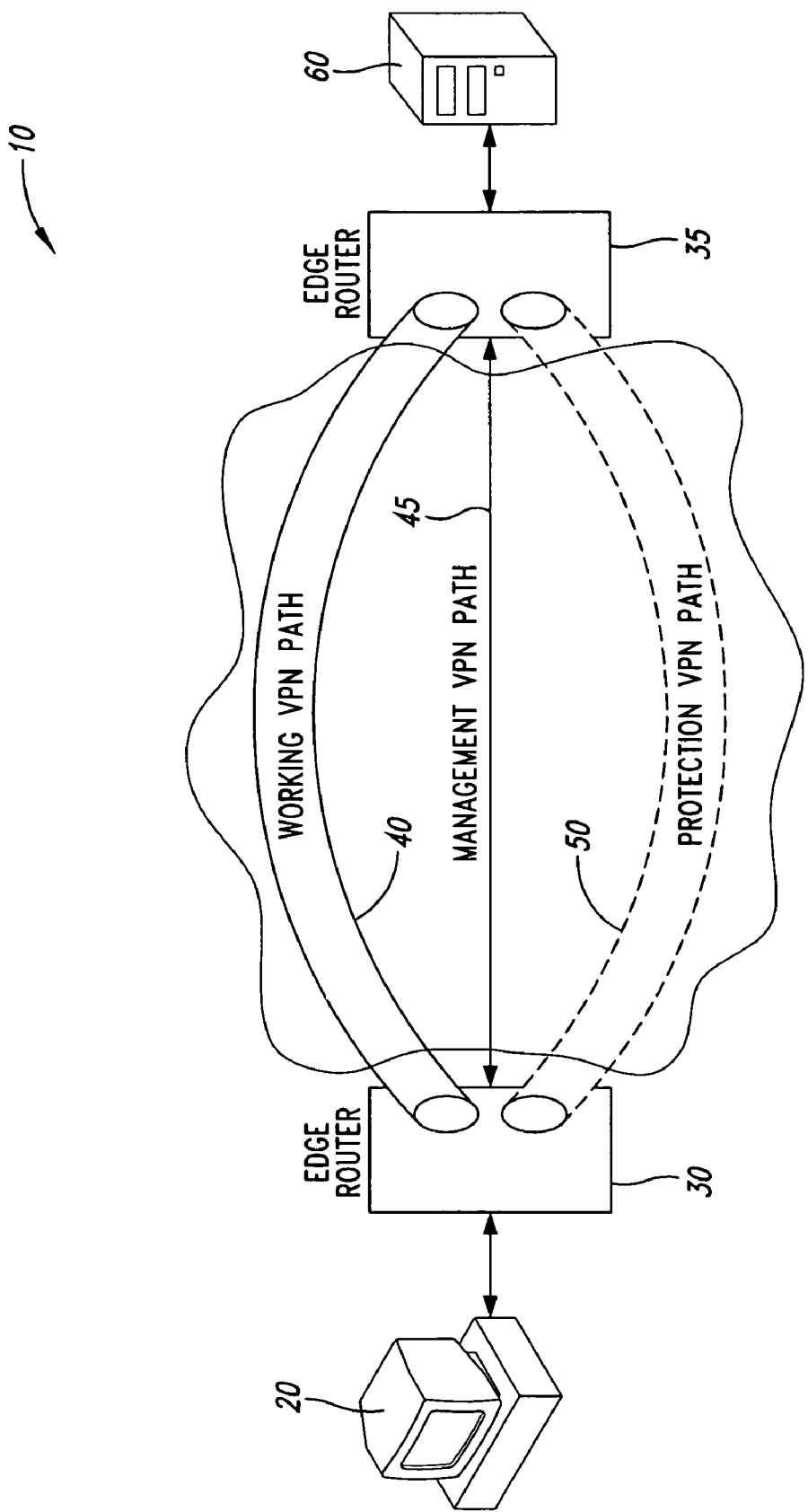
FIG. 1 is a schematic diagram showing protection switching for a virtual private network originating and terminating at the enterprise.

The invention relates to a method and apparatus for protection switching in a virtual private network. The invention can be implemented in any VPN environment, including, but not limited to: secured Internet, encapsulated IP protocol, Layer 2 switching in ATM, and Layer 2 switching in Frame Relay.

In the parent application, a method was disclosed for detection of either congestion or link failure in an ATM network, with the method further operating to implement a working and a protection path for links in the ATM network and to cause a switch of traffic from the working path to the protection path in case of such detection. In the case of a link failure, the method of the parent invention operates to cause all traffic on the failed link to be switched to the protection path. For the case of congestion detected on a link that exceeds a predetermined threshold, the method of the parent invention operates to cause a portion of the traffic on the working path for the link to be shifted to the protection path. The method of the parent invention also monitors failed or excessively congested working paths, and upon such a working path returning to a state of normal operation which would accommodate traffic having been switched to the protection path, operates to switch that protection path traffic back to the working path.

The present invention embodies a similar protection switching arrangement for VPN applications—i.e., detection of congestion or link failure in a VPN link and, upon such detection, switching at least a portion of the traffic on the link to a protection path. An algorithm for carrying out the method of the invention may be implemented in software, firmware, or hardware, depending upon the specific implementation of protection switching, including where the VPN originates and terminates to form matched pairs that define the protection switching arrangement for the VPN domain.

The protection switching method and apparatus of the present invention embodies the following steps:
1. The definition, allocation, operation, management, and implementation of a working VPN path, over which the normal operation of the VPN is effected.
2. The definition, allocation, operation, management, and implementation of a protection VPN path, over which the protection switching operation of the VPN is effected.
3. The configuration and implementation of the working VPN path and the protection VPN path prior to the operation of either path or during the operation of the working VPN path.
4. The detection of increased data traffic in the working VPN path or failure of the working VPN path.
5. The definition, allocation, operation, management, and implementation of a VPN switching agent, whereby data from the working VPN path is switched to the protection VPN path when increased data traffic or failure is detected in the working VPN path.
6. The detection of a return to proper function of the working VPN path.
7. The definition, allocation, operation, management, and implementation of a second VPN switching agent, whereby data from the protection VPN path is switched to the working VPN path when a return to proper functioning of the working VPN path is detected.

In a further embodiment of the invention, the step of defining, allocating, operating, managing, and implementing bandwidth management arrangements in the working VPN path and the protection VPN path may also be implemented for different quality-of-service (QoS) classes.

The establishment of working and protection VPN paths may be accomplished by methods currently known in the art. In conjunction with such known methods, the present invention establishes distinct sets of VPNs that may share originating and terminating endpoints, but minimizes shared virtual or physical paths or circuits.

Figure 2:
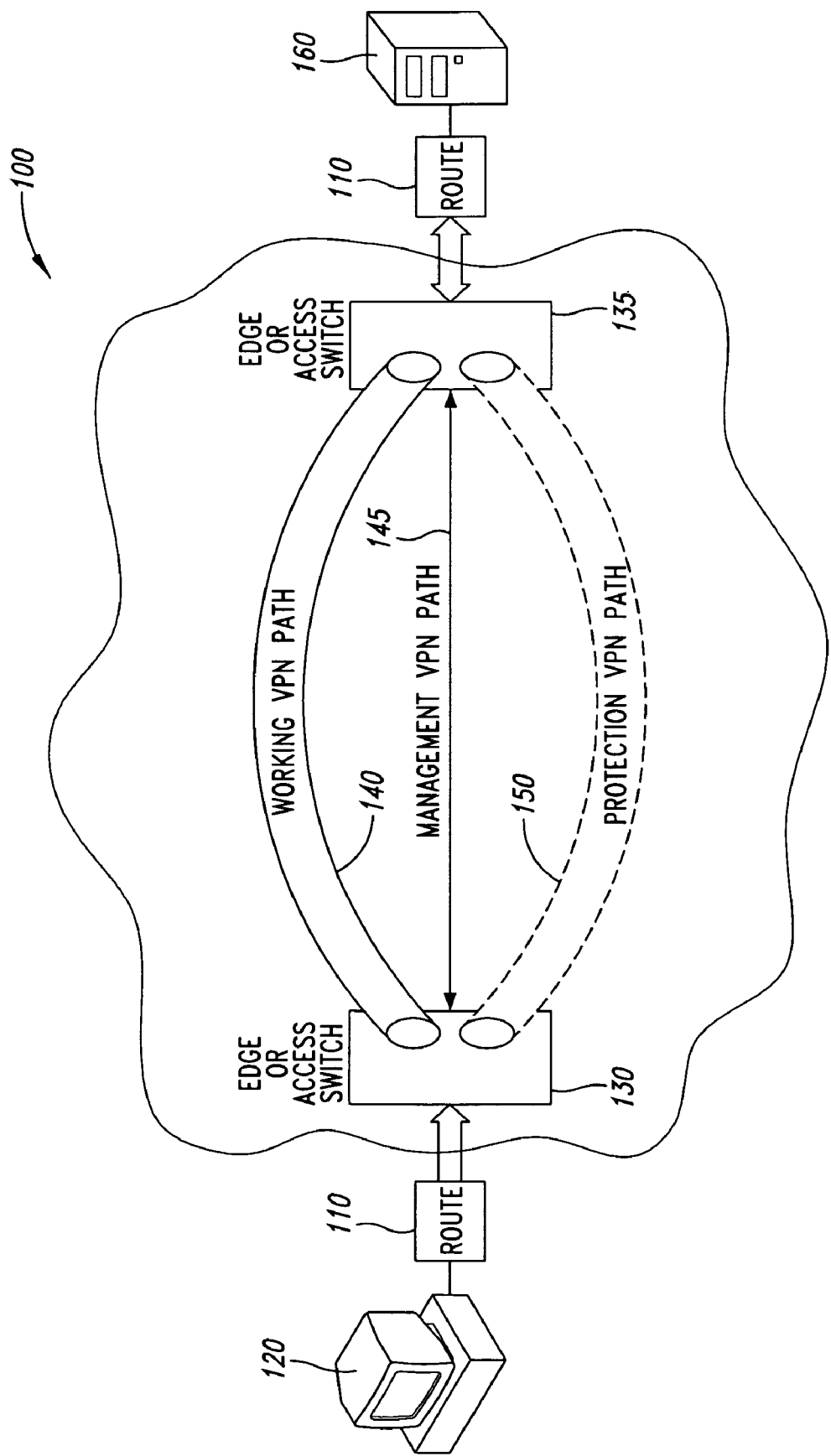
FIG. 2 is a schematic diagram showing protection switching for a virtual private network originating and terminating at a service provider point of presence (POP).

FIGS. 1 and 2 illustrate the method of the present invention utilized in an apparatus that works in at least two environments, namely, in the enterprise, and at a service provider's point of presence (POP). Those applications are described below.

FIG. 1 is a schematic diagram showing protection switching 10 for a virtual private network originating and terminating at the enterprise. A computer system 20 existing within an enterprise is connected to an edge router 30 for the transmission of data across a VPN. Edge router 30 establishes a VPN connection with a remote edge router 35 by establishing a working VPN path 40 and a protection VPN path 50 between edge router 30 and remote edge router 35. Additionally, different QoS profiles may be configured by edge router 30 by setting up additional working VPN paths 40 and protection VPN paths 50 for each QoS profile. Further, working VPN path 40 and protection VPN path 50 may be configured by edge router 30 and remote edge router 35 prior to the operation of either working VPN path 40 and protection VPN path 50, or during the operation of working VPN path 40.

Data is transmitted from edge router 30 to remote edge router 35 through working VPN path 40. Once data arrives at remote edge router 35, it is then forwarded to system 60, the destination of the data. Significantly, in a preferred embodiment, both edge router 30 and remote edge router 35 include a monitor/detection function which operates to monitor working VPN path 40 to determine if data congestion or failure occurs in working VPN path 40. If congestion or failure is detected, data is transferred from working VPN path 40 to protection VPN path 50, thereby ensuring seamless data transmission. Additionally, both edge router 30 and remote edge router 35 monitor working VPN path 40 for a return-to-normal condition (i.e., a lack of congestion or failure), and upon such return-to-normal condition being detected, data is switched back from protection VPN path 50 to working VPN path 40. Data arriving at remote edge router 35, via either working VPN path 40 or protection VPN path 50, is then sent to system 60, the destination of the data.

In addition to defining working VPN path 40 and protection VPN path 50, the invention establishes and maintains management VPN path 45 between edge router 30 and remote edge router 35. In this arrangement, management VPN path 45 synchronizes edge router 30 and remote edge router 35, and preferably utilizes no more than 10% of the total bandwidth of the VPN. Management VPN path 45 manages the transmission of data across working VPN path 40 and protection VPN path 50, and allows for "hitless" data transmission. Thus, when data is transferred from working VPN path 40 to protection VPN path 50, management VPN path 45 transfers any data lost during the switching of data from working VPN path 40 to protection VPN path 50. Further, time stamps transferred across working VPN path 40 and protection VPN path 50 are used in combination with management VPN path 45 to achieve "hitless" data transmission.

FIG. 2 is schematic diagram showing the protection switching 100 for a virtual private network originating and terminating at a service provider point-of-presence (POP). A computer system 120 is connected to a router 110 for transmission of data to and from the VPN. Router 110 controls the flow of data to and from computer system 120 and may be based on any of the available router technologies. Router 110 may also form part of a service provider's POP. Data that is allowed to pass from computer system 120 through router 110 is then forwarded to edge switch 130.

Edge switch 130 establishes connection with remote edge switch 135 through working VPN path 140 and protection VPN path 150, which provide parallel paths between the switches. A separate working-path/protection-path pair corresponding to working VPN 140 and protection VPN path 150 may be established for each of a plurality of QoS profiles. Working VPN path 140 and protection VPN path 150 may be configured by edge switch 130 and remote edge switch 135 prior to the operation of working VPN path 140 and protection VPN path 150, or during the operation of working VPN path 140.

As with the embodiment of FIG. 1, this embodiment of the invention incorporates a monitor/detection function that operates to detect data congestion or failure occurring in either working VPN path 140 or protection VPN path 150. In a preferred embodiment, that function is incorporated into edge switch 130 and remote edge switch 135. Data arriving at edge switch 130 is transmitted through working VPN path 140 to remote edge switch 135. Importantly, both edge switch 130 and remote edge switch 135 monitor working VPN path 140 in the same fashion as described for FIG. 1, above. If congestion or malfunctioning of working VPN path 140 is detected by either edge switch 130 or remote edge switch 135, data is transferred from working VPN path 140 to protection VPN path 150. Protection VPN path 150 is then used to transfer data between edge switch 130 and remote edge switch 135. Edge switch 130 and remote edge switch 135 continually monitor working VPN path 140 to detect a return to normal operating condition for that path (i.e., an absence of congestion or malfunction). If such a return-to-normal condition is detected, data is switched back from protection VPN path 150 to working VPN path 140.

Data arriving at remote edge switch 135, via either working VPN path 140 or protection VPN path 150, is then forwarded to router 110, which may form a part of a service provider's POP. If the data is accepted by router 110, it is then passed to its destination, system 160.

In addition to defining working VPN path 140 and protection VPN path 150, the invention establishes and maintains management VPN path 145 between edge switch 130 and remote edge switch 135. In this arrangement, management VPN path 145 synchronizes edge switch 130 and remote edge switch 135, and preferably utilizes no more than 10% of the total bandwidth of the VPN. Management VPN path 145 manages the transmission of data across working VPN path 140 and protection VPN path 150, and allows for "hitless" data transmission. Thus, when data is transferred from working VPN path 140 to protection VPN path 150, management VPN path 145 transfers any data lost during the switching of data from working VPN path 140 to protection VPN path 150. Further, time stamps transferred across working VPN path 140 and protection VPN path 150 are used in combination with management VPN path 145 to achieve "hitless" data transmission.

The protection switching arrangement of the invention enables the handling of network abnormalities, including, but not limited to, failures and congestion, in a seamless manner with respect to user applications. That protection switching arrangement treats excessive traffic congestion as a network failure, and switches data accordingly, thereby maintaining a required QoS for a given VPN.

In a preferred embodiment, a High Quality ("HQ") apparatus is implemented to carry out a detection and monitoring function, as to failures and excessive congestion, for the protection switching arrangement of the invention. That HQ apparatus may be operated independently of the router or switch operating at either end of a given working path and its associated protection path, or it may be incorporated into the router/switch on which it is associated. Modules within the HQ apparatus may include a congestion detector 72a to detect congestion on the working path and a normal operation detector 72b that detects a return to normal operation within the working path. These functions may be combined in a monitor module 72c. These detectors/modules may be incorporated into the HQ apparatus or integrated into the router or switch.

Operation of an exemplary HQ apparatus, based on an exchange of header, or overhead, data associated with data blocks being transmitted, is hereafter described. Other arrangements for implementation of the disclosed detection/monitoring function will, however, be apparent to those skilled in the art. All such implementations are intended to be within the scope of the invention disclosed and claimed herein.

For the preferred embodiment, the detection of network congestion and link failure (and corresponding protection switching based thereon) is enabled through the use of block overheads ("BLOHs") for the data being transmitted. Blocks can be cells for ATM transport or packets for IP or any native mode transport information in each VPN path or channel. Each BLOH consists of the following fields, each of which can be expanded for future enhancements:

Block 1: High priority block (loop-back block for congestion prevention)

Block 2: Low priority block (loop-back block for congestion prevention)

Blocks 3-12: Loop-back blocks (for loss detection)

Block 13: Current initial block ID with time stamp for block frame, sent on the working VPN path Block 14: Current final block ID with time stamp for block frame, sent on the working VPN path Block 15: Next initial block ID for the working VPN path Block 16: Next final block ID for the working VPN path (next 16 blocks reserved for future usage.)

The above block layout is common to all BLOHs for signals utilizing VPNs operate according to the protection switching methodology of the invention. Hitless network operation is disclosed in the U.S. patent application Ser. No. 09/249,001, filed Feb. 12, 1999, now U.S. Pat. No. 6,426,941, the entire disclosure of which is expressly incorporated herein by reference.

Figure 3:
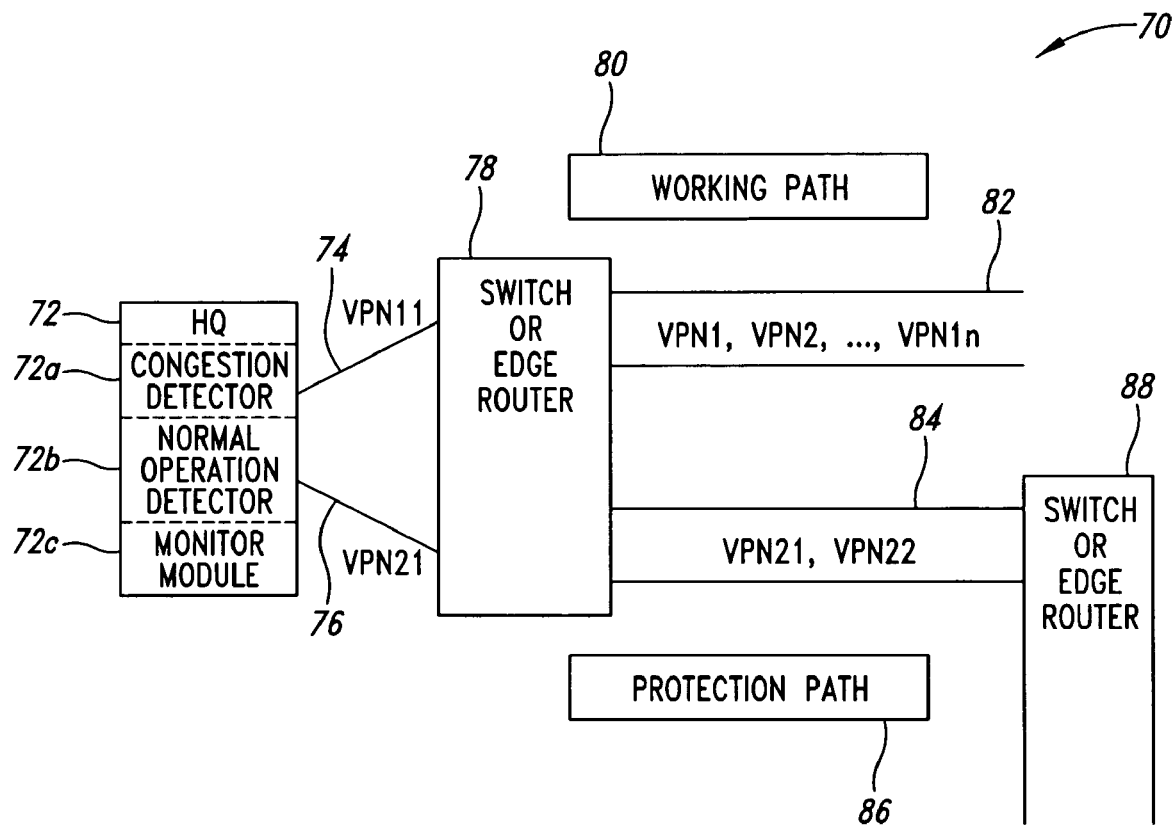
FIG. 3 is a block diagram showing the organization of channel capacity of the present invention.

An exemplary channel arrangement for the VPN protection-switching methodology of the invention is illustrated in FIG. 3. Both the general operation of that protection switching methodology and the particular role of the BLOHs in that operation are usefully described with respect to that figure. The protection switching methodology 70 of the invention begins with operation of HQ apparatus 72, which establishes a first VPN 74 and a second VPN 76. It is to be understood that additional VPNs may be established by HQ apparatus 72. First VPN 74 and second VPN 76, including any additional VPNs, are connected to edge router 78. Edge router 78 then connects the VPNs across working path 80 and protection path 86 utilizing first channel 82 and second channel 84. Additional channels may be included in the present invention. Once VPNs are connected through working path 80 and protection path 86 utilizing either first channel 82 or second channel 84, the VPNs are connected to remote edge router 88, where they ultimately can be connected to the destination network or machine.

The management channel of the present invention can be used to monitor and detect problems on the working path and to switch data from the working path to the protection path in response to a failure of or congestion in the working path. The management channel comprises information that is transmitted through the working path of the VPN in conjunction with time stamps and other measurement parameters. No synchronization is required between the end nodes connected by the working and protection paths. Further, information transmitted in the management channel can be analyzed by algorithms that detect failures and the onset of congestion in the working path. Generally, the amount of bandwidth used by the management channel is substantially lower than the bandwidth used by the working path.

VPNs utilizing channels 82 and 84 of FIG. 3 may be organized in the following fashion:

VPNi1, VPNi2, . . . , VPN ii may be used for user information paths;

VPNij may be used as a spare or for a protection path; and

VPNin may be used as a management path for HQ device or edge routers

HQ device 72 sets up working path 80. VPNi1 for a user application is sent along working path 80 using channel 82. Simultaneously, VPNk1, also used for the same user application, is sent along protection path 86 using channel 84. HQ device 72 continually tracks the availability of spare VPNij and management VPNin. Protection switching between working path 80 and protection path 86 occurs when working path 80 fails. In such an event, HQ apparatus 72 switches over to protection path 86. Information being sent on working path 80 at the time of a failure is sent to protection path 86. Time stamps embedded in the BLOHs allow for seamless recovery of data when a switch between working path 80 and protection path 86 occurs. For hitless operation, the current block is copied at the sending side and is resent on the management channel of the protection path to assure that there is no loss of information. Additionally, the current block may also be copied to the protection path to ensure data integrity.

Figure 4:
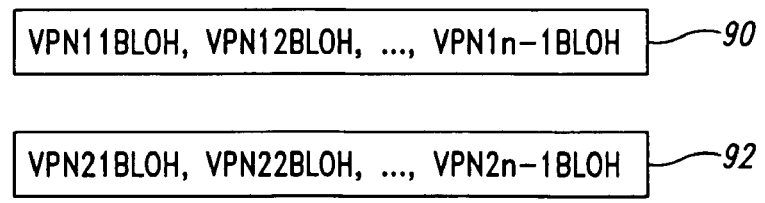
FIG. 4 is a block diagram showing the organization of management channels.

Organization of management channels is depicted in FIG. 4. VPN1$n$ and VPN2$n$ are the management channels for operation of the network. Block overheads ("BLOH") of VPN11 through VPN1$n$–1 are transmitted on a first management channel 90, while BLOHs of VPN21 through VPN$n$–1 are transmitted on a second management channel 92.

Figure 5:
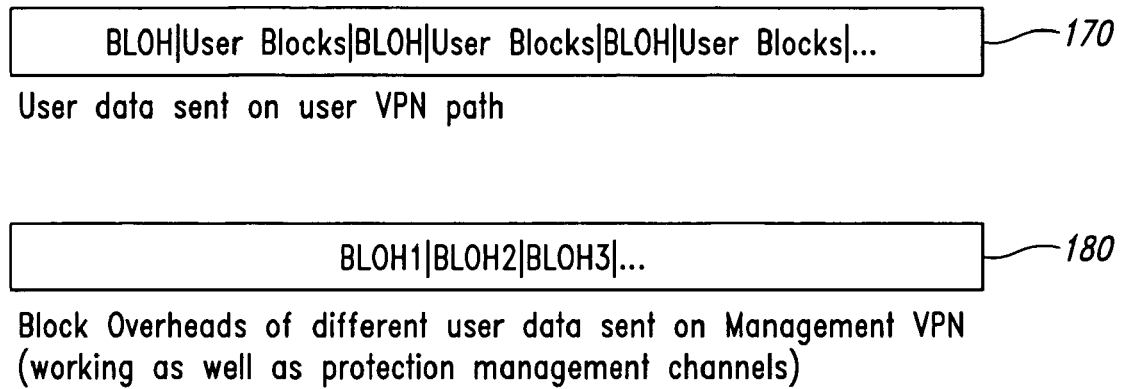
FIG. 5 is a block diagram showing the organization of user information blocks and block overheads.

FIG. 5 is a diagram showing an arrangement of BLOHs for the method of the invention. User information and block overheads may be transmitted across either a working path or a protection path according to grouping 170, whereby block overheads are transmitted in sequence with one or more user blocks. Block overheads assigned to different user blocks are also transmitted on the management channel according to grouping 180. The block overheads of grouping 180 may originate from either the working path or the protection path.

Failure of the working path may be detected by the monitoring of varying BLOHs by a monitor module 72$c$ in the HQ device. Blocks 3-12 of each BLOH consist of a loop-back block that is sent by the sending HQ device and received by a receiving HQ device on each user channel. The receiving HQ device receives the clocks and sends them back to the sending HQ device on a reverse or management channel. The HQ device sets up a threshold that indicates whether a loss of signal has occurred. For an illustrative embodiment of the invention, the threshold is set at 70% of the blocks, or 7 blocks. If the number of blocks returned is less than or equal to the threshold, a failure of the working path is detected. Alternately, failure may be detected by the receiving HQ device by comparing the blocks it receives with the corresponding BLOH transmitted via the management path.

In the event that a receiving HQ device determines that the threshold has been met and a failure of the working path has occurred, the HQ device waits for the sending HQ device to switch to the protection path. On the other hand, if the sending HQ device detects a failure of the working path using the threshold comparison, it re-sends the lost information between two BLOHs which are time-stamped to ensure that there is no loss of information. When the working path is later restored, both the sending and receiving HQ devices will revert to the working path.

The protection switching scheme and apparatus of the present invention also allows for the detection and handling of network congestion. Blocks 1 and 2 of the BLOH are used to detect the onset of congestion. Block 1 is a high priority block and Block 2 is a low priority block. These blocks are sent back from the receiving HQ device to the monitor module 72$c$ or a congestion monitor 72$b$ in a sending HQ device. Therefore, the sending HQ device can compute the round-trip delay of the high priority block as well as that of the low-priority block. The relative delay difference (Delta) is calculated by subtracting the round-trip delay of Block 2 from the round-trip delay of Block 1. When traffic congestion occurs in the network, then Delta increases as the network processes the low-priority block more slowly.

Figure 6:
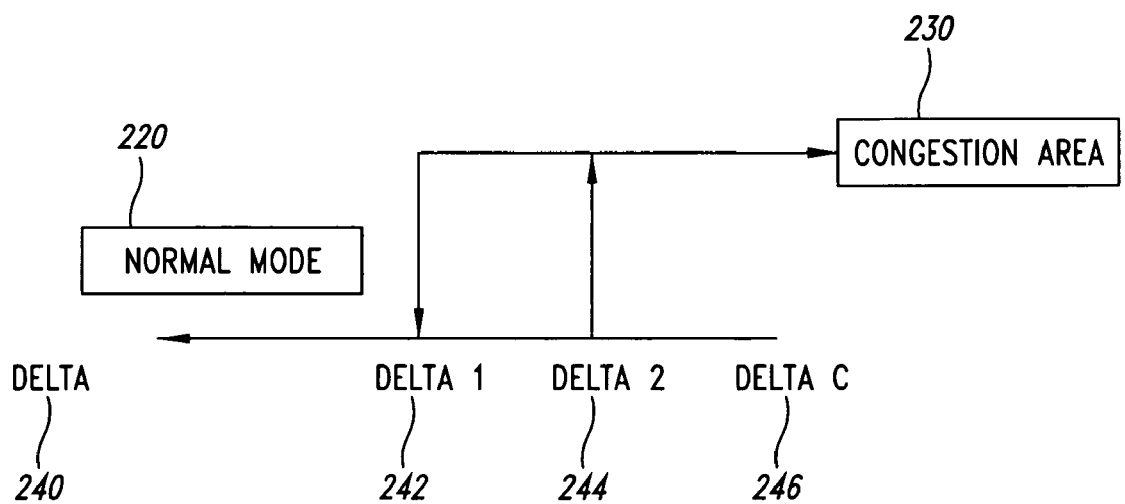
FIG. 6 is a diagram showing increased data traffic detection and handling along a VPN.

FIG. 6 is a diagram showing the detection and handling of congestion using the aforesaid delta values in a hysterisis function. As shown in the figure, three delay thresholds are established: Delta 1, Delta 2, and Delta C. The highest threshold, Delta C, is established at the point of maximum acceptable network congestion. The lowest threshold, Delta 1, is established at the upper limit for "normal" operation of the channel—i.e., before any congestion occurs. The intermediate threshold, Delta 2, is set at a point below Delta C at which a sufficient degree of congestion occurs to merit off-loading of traffic to another channel and to avoid further congestion. In a preferred embodiment, the Delta 2 threshold is maintained at less than 0.8 of Delta C. The delay differential between Delta 1 and Delta 2 is a buffer zone in which the channel may operate without off-loading traffic.

Thus, when Delta<Delta 1, the system is operating in normal mode and the working path is used to send all of the user information blocks. When Delta>Delta 2, the channel has reached an unacceptable level of congestion. In that circumstance, the data is partially split for sending a portion via the protection path along with the balance being sent via the working path. Once in the congestion area, i.e., Delta>Delta C, the system waits until Delta<Delta 1 to switch back to normal mode and to re-route traffic to the working channel.

The system does not go into congestion mode unless the overall capacity is excessively over-used. This situation indicates that the capacity is not dimensioned properly for network operation. Further, the failures handled by the present invention include, but are not limited to: link failures, system failures, hardware failures, software failures, power failures, firmware failures, security failures (i.e., resulting from a violation of VPN policies, firewall policies, or repeated attempted accesses from an unauthorized user or system), encryption violation (i.e., the failure of a secured domain requiring a new protection path), and loss of signal in wireless systems.

Having thus described the invention in detail, it is to be understood that the foregoing description is not intended to limit the spirit and scope thereof. What is desired to be protected by Letters Patent is set for in the appended claims.

What is claimed is:

1. A method for implementing protection switching for a computer network comprising:

establishing a working network path and a protection network path between a first network node and a second network node;

establishing a maximum acceptable network congestion level;

establishing a maximum acceptable network traffic congestion level for no congestion; and switching traffic from the working network path to the protection network path when detected traffic in the working network path exceeds a predetermined maximum acceptable network traffic level for no congestion and is less than a maximum acceptable network congestion level.

2. The method of claim 1, further comprising:
detecting failure of the working network path; and
switching traffic from the working network path to the protection network path when failure of the working network path is detected.

3. The method of claim 1, further comprising:
detecting a return to proper functioning of the working network path; and
switching traffic from the protection network path to the working network path when the return to proper functioning of the working network path is detected.

4. The method of claim 1, further comprising:
establishing a management channel network path;
connecting the management channel between said first network node and said second network node;
transmitting time stamps across the management channel;
transmitting network measurement parameters across the management channel; and
analyzing the time stamps and the network management parameters to detect failures or congestion in the working network path.

5. The method of claim 4 wherein the time stamps and the network management parameters are analyzed by an algorithm in the first network node.

6. The method of claim 4 wherein the time stamps and the network management parameters are analyzed by an algorithm in the second network node.

7. The method of claim 4 wherein the working network path has an overall capacity and the management channel has a utilization not exceeding approximately ten percent of the overall capacity.

8. The method of claim 4, further comprising creating a plurality of working network paths wherein the management channel network path is created using one of the plurality of working network paths.

9. The method of claim 1, further comprising sending time stamps across the working network path and the protection network path.

10. The method of claim 9, further comprising utilizing the time stamps for synchronizing data transmission across the working network path and the protection the network path.

11. The method of claim 9, further comprising utilizing the time stamps to enable recovery of data lost on the working network path and the protection network path.

12. The method of claim 1, further comprising:
establishing quality of service parameters for each of the working network path and the protection network path;
assigning the quality of service parameters to each of the working network path and the protection network path; and
synchronizing the first network node and the second network node according to the quality of service parameters.

13. The method of claim 1 wherein the working network path is a virtual private network path and the protection network path is a virtual private network path.

14. The method of claim 1 wherein the network is an asynchronous transfer mode (ATM) network.

15. An apparatus for protection switching of a computer network comprising:

a congestion detector configured to detect traffic congestion on a working network path connected between a first network node and a second network node wherein data is transmitted across the working network path; and
a data switch configured to switch data to be transmitted on the working network path to a protection network path connected between the first network node and the second network node if the congestion detector detects traffic congestion on the working network path that exceeds a predetermined maximum acceptable network traffic level for no congestion and is less than a maximum acceptable network congestion level.

16. The apparatus of claim 15, further comprising a failure detector configured to detect failure of the working network path wherein the data switch is further configured to switch data to be transmitted on the working network path to the protection network path when the failure detector detects a failure of the working network path.

17. The apparatus of claim 15, further comprising a normal operation detector configured to detect a return to normal functioning of the working network path following the detection of traffic congestion on the working network path by the congestion detector, and wherein the data switch is further configured to switch data to be transmitted on the protection network path to the working network path when the normal operation detector detects a return to normal functioning of the working network path.

18. The apparatus of claim 15, further comprising:
wherein the congestion detector is configured to analyze a plurality of analyzes the time stamps and the network measurement parameters transmitted across the management channel in order to detect a failure or congestion in the working network path.

19. The apparatus of claim 18 wherein the first network node includes the congestion detector.

20. The apparatus of claim 18 wherein the second network node includes the congestion detector.

21. The apparatus of claim 18 wherein the working network path has an overall capacity, and wherein the apparatus is configured to limit utilization of the management channel to an amount not exceeding approximately ten percent of the overall capacity.

22. The apparatus of claim 15, wherein the apparatus is further configured to transmit a plurality of time stamps sent across the working network path and the protection network path.

23. The apparatus of claim 22 wherein the plurality of time stamps are configured to synchronize data transmitted across the working network path and the protection network path.

24. The apparatus of claim 22 wherein the plurality of time stamps are configured to enable recovery of data lost from the working network path and the protection network path.

25. The apparatus of claim 15, further comprising a plurality of quality of service parameters assigned to the working network path and the protection network path.

26. The apparatus of claim 25 wherein the first network node and the second network node are synchronized according to the plurality of quality of service parameters.

27. The apparatus of claim 15 wherein the working network path is a working virtual private network path and the protection network path is a working virtual private network path.

28. The apparatus of claim 15 wherein the working network path and the protection network path are part of an asynchronous transfer mode network.

29. An apparatus to implement switching between a working network path and a protection network path in a computer network, comprising:

a monitor module configured to monitor the working network path to monitor traffic flow thereon, the monitor module configured to cause a switch in traffic from the working network path to the protection network path in response to a detected event, wherein the detected event is selected from a group of events consisting of: congestion in the working network path that exceeds a predetermined maximum acceptable network traffic level for no congestion and is less than a maximum acceptable network congestion level and link failure in the working network path.

30. The apparatus of claim 29 wherein the monitor module is configured to continue to monitor the working network path following the switch in traffic from the working network path to the protection network path, the monitor module further configured to cause a switch in traffic from the protection network path to the working network path if the event selected from the group of events is congestion in the working network path and traffic flow in the working network path no longer exceeds the predetermined threshold.

31. The apparatus of claim 29 wherein the monitor module is configured to continue to monitor the working network path following the switch in traffic from the working network path to the protection network path, the monitor module further configured to cause a switch in traffic from the protection network path to the working network path if the event selected from the group of events is link failure in the working network path and the monitor module determines that there is no longer a link failure in the working network path.

32. The apparatus of claim 29 wherein the working network path and the protection network path are established between first and second router/switches, the monitor module being integrated into one of the first and second router/switches.

33. The apparatus of claim 29 wherein the working network path and the protection network path are established between first and second router/switches, the monitor module being operative independently from the first and second router/switches.

34. The apparatus of claim 29 wherein the working network path is a virtual private network path and the protection network path is a virtual private network path.

35. The apparatus of claim 29 wherein the working network path and the protection network path are part of an asynchronous transfer mode network.

36. A computer network comprising:

a router/switch configured for communication over a communication network, the router/switch being configured to establish a working network path and a protection network path over the communication network; and a monitor module configured to monitor the working network path to monitor traffic flow thereon, the monitor module configured to cause the router/switch to switch traffic from the working network path to the protection network path in response to a detected event, wherein the event is selected from a group of events consisting of: congestion in the working network path that exceeds a predetermined maximum acceptable network traffic level for no congestion and is less than a maximum acceptable network congestion level and link failure in the working network path.

37. The apparatus of claim 36 wherein the monitor module is configured to continue to monitor the working network path following the switch in traffic from the working network path to the protection network path, the monitor module configured to cause the router/switch to switch traffic from the protection network path to the working network path if the event that caused the router/switch to switch traffic from the working network path to the protection network path is no longer present.

38. The apparatus of claim 36 wherein the monitor module is integrated into the router/switch.

39. The apparatus of claim 36 wherein the monitor module is configured to operate independently from the router/switch.

40. The apparatus of claim 36 wherein the working network path is a working virtual private network path and the protection network path is a working virtual private network path.

41. The apparatus of claim 36 wherein the working network path and the protection network path are part of an asynchronous transfer mode network.

* * * * *